US007355764B2

(12) United States Patent
Ooshima et al.

(10) Patent No.: US 7,355,764 B2
(45) Date of Patent: Apr. 8, 2008

(54) IMAGE READING SYSTEM

(75) Inventors: Toshiaki Ooshima, Nagano (JP);
Kenichiro Amemiya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 995 days.

(21) Appl. No.: 10/378,399

(22) Filed: Mar. 3, 2003

(65) Prior Publication Data

US 2004/0004742 A1 Jan. 8, 2004

(30) Foreign Application Priority Data

Mar. 1, 2002 (JP) .......................... P2002-055554

(51) Int. Cl.
H04N 1/04 (2006.01)
H04N 1/40 (2006.01)

(52) U.S. Cl. .................... 358/488; 358/471; 358/474; 358/496

(58) Field of Classification Search ............... 358/488, 358/471, 474, 475, 496, 497; 355/311
See application file for complete search history.

(56) References Cited

U.S. PATENT DOCUMENTS

| 4,630,127 A | 12/1986 | Fuwa ......................... 358/285 |
| 4,870,294 A | 9/1989 | Hasegawa ..................... 250/578 |
| 5,568,281 A * | 10/1996 | Kochis et al. ............... 358/475 |

FOREIGN PATENT DOCUMENTS

| EP | 0 291 077 A2 | 11/1988 |
| EP | 0 400 490 A2 | 12/1990 |
| JP | 04-211563 | 8/1992 |
| JP | 05-207239 | 8/1993 |
| JP | 06-178057 | 6/1994 |
| JP | 09-191370 | 7/1997 |
| JP | 09-247347 | 9/1997 |
| JP | 11-075025 | 3/1999 |
| JP | 2001-066712 | 3/2001 |
| JP | 2001-069317 | 3/2001 |
| JP | 2002-3168666 | 3/2001 |
| JP | 2003-163797 | 6/2003 |
| JP | 2004-077991 | 3/2004 |

OTHER PUBLICATIONS

European Search Report.
Japanese Office Action mailed Dec. 21, 2004 (along with English translation).

* cited by examiner

*Primary Examiner*—Houshang Safaipour
(74) *Attorney, Agent, or Firm*—John J. Penny, Jr.; Edwards Angell Palmer & Dodge LLP

(57) ABSTRACT

There are provided an original table (11) for an original, a linear image sensor (20) for converting light into an electric signal, a first optical system (30) for forming an optical image on a main scanning line onto the linear image sensor, a sub scanning unit for scanning the main scanning line in parallel with a sub scanning direction, and a second optical system (40) forming an optical path that reaches the linear image sensor from a detecting position (P) on the plate surface (12), which is remote from the main scanning line in a sub scanning direction. A size and an orientation of an original are decided based on an electric signal converted from light that reaches the linear image sensor from the main scanning line via the first optical system, and an electric signal converted from light that reaches the linear image sensor from the detecting position via the second optical system.

3 Claims, 9 Drawing Sheets

FIG. 5

| ORIGINAL SIZE AND ORIENTATION | ABBREVIATION | LENGTH IN MAIN SCANNING DIRECTION (mm) | LENGTH IN SUB SCANNING DIRECTION (mm) |
|---|---|---|---|
| A5 HORIZONTAL | A5H | 210 | 148 |
| B5 HORIZONTAL | B5H | 257 | 182 |
| EXECUTIVE HORIZONTAL | EXH | 266.7 | 184.15 |
| A5 VERTICAL | A5V | 148 | 210 |
| A4 VERTICAL | A4H | 297 | 210 |
| LETTER HORIZONTAL | LTH | 279.4 | 215.9 |
| B5 VERTICAL | B5V | 182 | 257 |
| EXECUTIVE VERTICAL | EXV | 184.15 | 266.7 |
| LETTER VERTICAL | LTV | 215.9 | 279.4 |
| A4 VERTICAL | A4V | 210 | 297 |
| LEGAL VERTICAL | LGV | 215.9 | 355.6 |
| B4 VERTICAL | B4V | 257 | 364 |
| A3 VERTICAL | A3V | 297 | 420 |
| DOUBLE LETTER VERTICAL | WLV | 279.4 | 431.8 |

FIG. 7A

| A | 710-715 |
|---|---|
| B | 3614-3619 |
| C | 4469-4474 |
| D | 5031-5036 |
| E | 5220-5225 |
| F | 6418-6423 |
| G | 6718-6723 |

FIG. 7B

| A5H | A-C |
|---|---|
| B5H | A-E |
| EXH | A-E |
| A5V | A |
| A4H | A-G |
| LTH | A-F |
| B5V | A-B |
| EXV | A-B |
| LTV | A-D |
| A4V | A-C AND P |
| LGV | A-D AND P |
| B4V | A-E AND P |
| A3V | A-G AND P |
| WLT | A-F AND P |

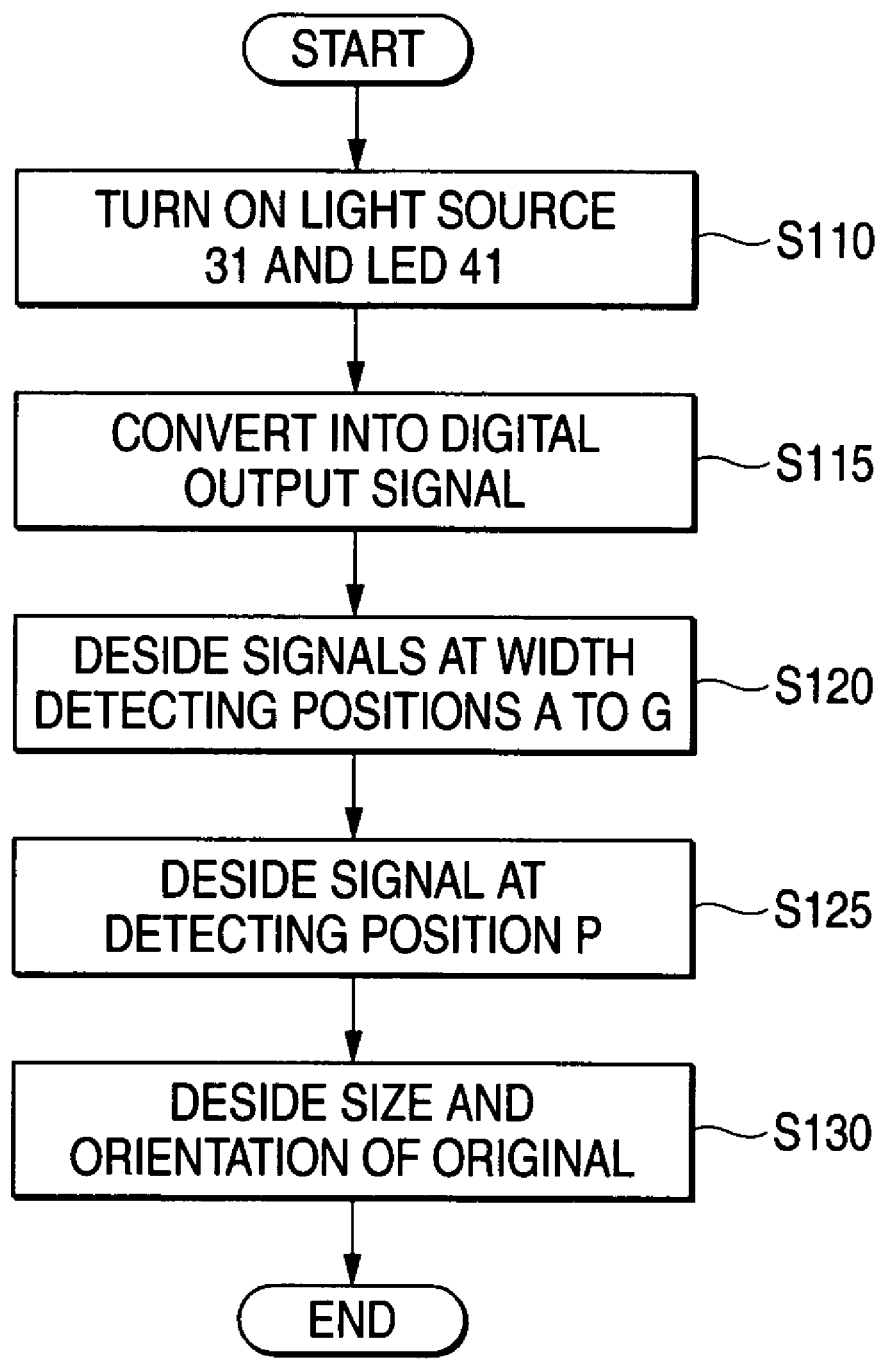

ately. Since the optical sensor is provided separately, detecting of the length of the original in the main scanning direction and detecting of the presence/absence of the original can be simultaneously executed. Thus, the size and orientation of the original can be detected in a short time.

IMAGE READING SYSTEM

BACKGROUND OF THE INVENTION

The present invention relates to an image reading system

Generally, as an image reading system for reading an original such as a photograph, a document, etc., an image scanner, an electronic copying apparatus, a facsimile, etc. are known.

In such image reading system, first the size and orientation of an original that is put on an original table are detected, and then reading control, selection of a print paper, etc. are executed based on the detected size and orientation of the original.

As the means for detecting the size and orientation of the original, the means disclosed in Patent Application Hei 4-34200 (Japanese Patent No. 3168666), for example, is employed. The size and orientation of the original can be decided based on a length of the original in the main scanning direction and presence/absence of the original at predetermined positions on the original table. Therefore, in the means disclosed in Patent Application Hei 4-34200 (Japanese Patent No. 3168666), the length of the original in the main scanning direction is detected by a linear image sensor that is used to read the original, while the presence/absence of the original at the predetermined positions on the original table is detected by an optical sensor and light source, both are provided separately from the linear image sensor used to read the original and the light source respectively. Since the optical sensor is provided separately, detecting of the length of the original in the main scanning direction and detecting of the presence/absence of the original can be simultaneously executed. Thus, the size and orientation of the original can be detected in a short time.

As another means for detecting the size and orientation of the original, first the length in the main scanning direction is detected by using the linear image sensor used to read the original, then a carriage on which an optical system for focusing an optical image onto the linear image sensor is mounted is moved in the sub scanning direction, and then the presence/absence of the original at the predetermined positions is detected by using such linear image sensor. Thus, the size and orientation of the original can be detected without the provision of another optical sensor and another light source.

However, if the optical sensor and the light source are provided separately to detect the presence/absence of the original at the predetermined positions on the original table, such a problem is caused that a production cost of the image reading system is increased. In contrast, if the length in the main scanning direction and the presence/absence of the original at the predetermined positions on the original table are defected by moving the carriage while using one linear image sensor, there is no necessity that the optical sensor and the light source should be provided separately, nevertheless such problems are caused that the length in the main scanning direction and the presence/absence of the original at the predetermined positions cannot be detected simultaneously and it takes a lot of time to detect the size and orientation of the original.

SUMMARY OF THE INVENTION

The present invention has been made to overcome the above problems, and it is an object of the present invention to provide an image reading system capable of deciding the size and orientation of an original in a short time without provision of a dedicated sensor.

In order to solve the aforesaid object, the invention is characterized by having the following arrangement.

(1) An image reading system comprising:

an original table on which an original is put;

a linear image sensor for converting light into an electric signal;

a first optical system for forming an optical image on a main scanning line onto the linear image sensor;

a sub scanning unit for moving the main scanning line in parallel with a sub scanning direction perpendicular to the main scanning line along a plate surface of the original table;

a second optical system forming a first optical path that reaches the linear image sensor from a detecting position on the plate surface of the original table, the detecting position being remote from the main scanning line in a sub scanning direction; and a deciding unit for deciding a size and an orientation of an original based on an electric signal, which is converted from light that reaches the linear image sensor from the main scanning line via the first optical system, and an electric signal, which is converted from light that reaches the linear image sensor from the detecting position via the second optical system.

(2) The image reading system according to (1), wherein the linear image sensor includes a first light receiving element into which an optical image on the main scanning line is input and a second light receiving element different from the first light receiving element, and the second optical system forms an optical path that reaches the second light receiving element from the detecting position.

(3) The image reading system according to (1), wherein the second optical system includes a light source for irradiating the detecting position, and mirrors for reflecting light input from the detecting position to a direction that reaches the linear image sensor via at least a part of the first optical system.

(4) The image reading system according to (1), wherein the first optical system includes a light source for irradiating the original table, and light from the light source, which is reflected by the original put on the original table, reaches the linear image sensor via at least a part of the first optical system.

(5) The image reading system according to (4), wherein the second optical system includes a light source for irradiating the detecting position, and light from the detecting position reaches the linear image sensor via the first optical path and at least a part of the first optical system.

(6) The image reading system according to (4), wherein the light source irradiates the detecting position via a second optical path, and light from the detecting position reaches the linear image sensor via the first optical path and at least a part of the first optical system.

BRIEF DESCRIPTION OF THE DRAWINGS

FIG. 5 is a table showing the size and orientation of an original, which can be read by the image scanner according to the first embodiment of the present invention.

FIG. 7A is a table showing a correspondence between length detecting positions shown in FIG. 6 and numbers of light receiving elements into which optical images being detected at respective positions are input, and FIG. 7B is a decision table used to decide the size and orientation of the original.

FIG. 8 is a flowchart showing a flow of processes by which the image scanner according to the first embodiment of the present invention detects the size and orientation of the original.

DETAILED DESCRIPTION OF PREFERRED EMBODIMENTS

A plurality of embodiments of the present invention will be explained with reference to the drawings hereinafter.

First Embodiment

Figure 1:
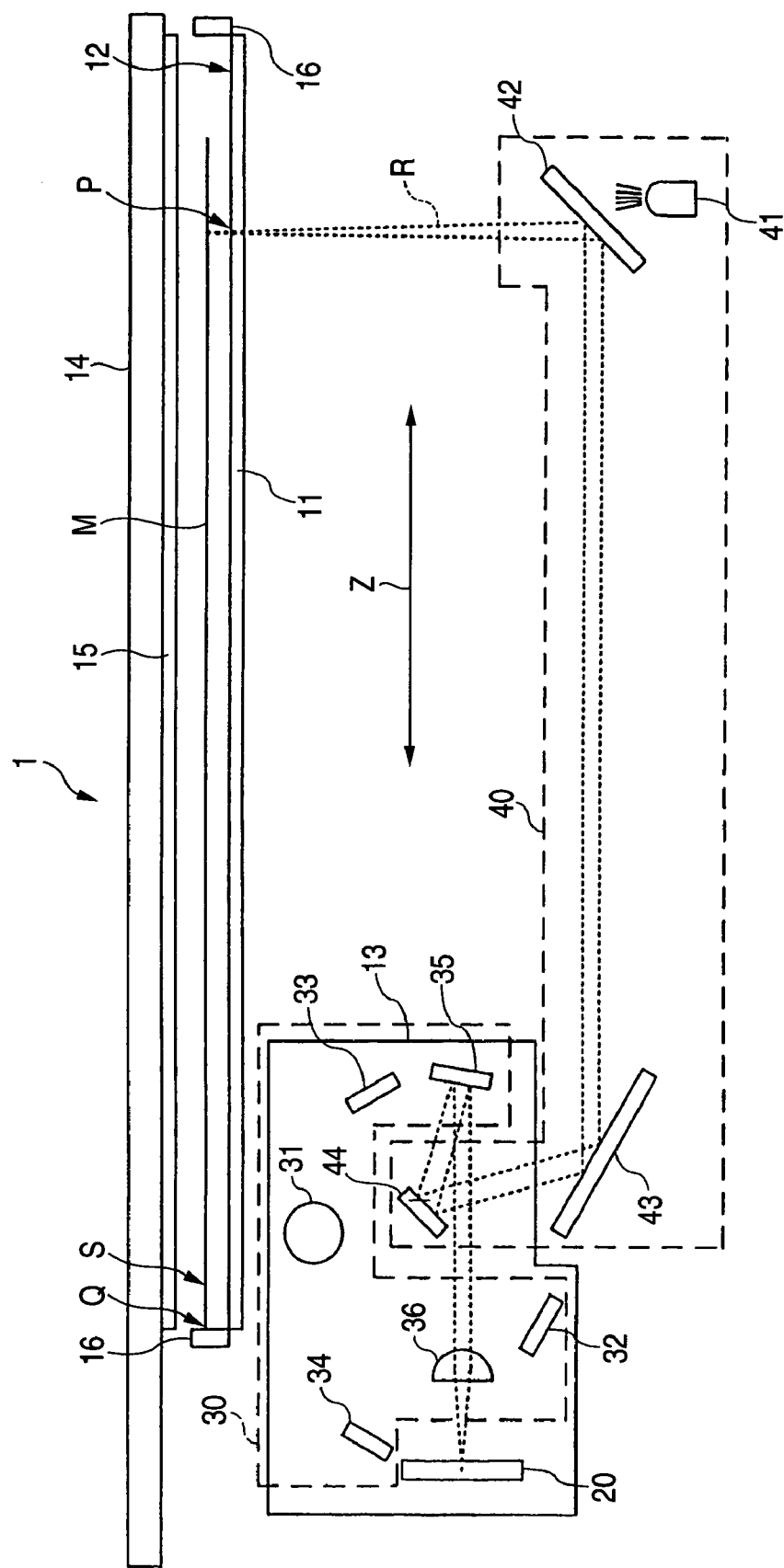
FIG. 1 is a schematic view showing an image scanner according to a first embodiment of the present invention.

FIG. 1 is a schematic view showing an image scanner 1 as an embodiment of an image reading system according to the present invention. The image scanner 1 is a so-called flat bed type in which an original table 11 is provided on an upper surface of a rectangular parallelepiped main body.

The original table 11 is formed of a transparent plate such as an almost rectangular glass plate. An original M such as a photograph, a document, or the like is put on a plate surface 12 of the original table 11. An original guide 16 like an almost rectangular frame is jointed to a peripheral portion of the original table 11. The original guide 16 contacts the original M to position the original M on the plate surface 12 of the original table 11.

An original cover 14 is coupled pivotally to the main body. The original cover 14 presses the original M put on the original table 11, and covers the original table 11 such that lights except irradiated lights of a light source 31 and an LED 41 never irradiate the original. An original mat 15 is colored in white and secured to the original cover 14. In this case, an open/close sensor (not shown) is provided to the original cover 14. When an operation to close the original cover 14 is started, a detect signal is output to a control portion 70 described later.

A carriage 13 is installed into the main body in parallel with the plate surface 12 so as to allow reciprocating motion of the carriage. The carriage 13 contains a linear image sensor 20 and a first optical system 30, and is fitted slidably to a guiding shaft, or the like, which is positioned in parallel with the plate surface 12 of the original table 11. A longitudinal shaft of the guiding shaft extends in the Z direction in FIG. 1. The carriage 13 is pulled by a belt, for example, to carry the linear image sensor 20 and the first optical system 30 in the Z direction in FIG. 1. A standby position of the carriage 13 is set to a position from which an optical image on the main scanning line, which is positioned in vicinity of an edge portion of the original table 11, can be input into the linear image sensor 20. In the first embodiment, the standby position is set to a position from which the optical image that is positioned away from an origin Q on the main scanning line S, which is set in vicinity of the original guide 16 on the original table 11, by 10 mm in the sub scanning direction can be focused. In this case, if the optical image of the minimum size original, which is put on a predetermined reading position on the original table 11, on the main scanning line can be input into the linear image sensor 20 from the position, a distance to the standby position of the carriage 13 from the origin Q may be set to any distance.

The linear image sensor 20 is installed into the carriage 13 in such a fashion that a plurality of light receiving elements such as photo diodes, etc. are aligned linearly in the direction perpendicular to a surface of the sheet in FIG. 1. The linear image sensor 20 scans an optical image on the main scanning line, which is focused by the first optical system 30, and light, which is guided by a second optical system 40, respectively and then outputs electric signals that correspond to the optical image and the light. The linear image sensor 20 stores charges, which are obtained by photoelectric converting the lights in predetermined wavelength ranges such as visible rays, infrared rays, ultraviolet rays, etc., for a constant time and then outputs the electric signals, which respond to a quantity of received light every light receiving element respectively, by using CCDs (Charge Coupled Devices), MOS transistor switches, etc. In this case, the linear image sensor 20 has the light receiving elements onto which the optical image on the main scanning line is focused by the first optical system 30 and spare light receiving elements which are arranged further on the outside of the above elements. Also, assume that the numbers used to identify uniquely the light receiving elements are affixed to all the light receiving element.

Figure 2:
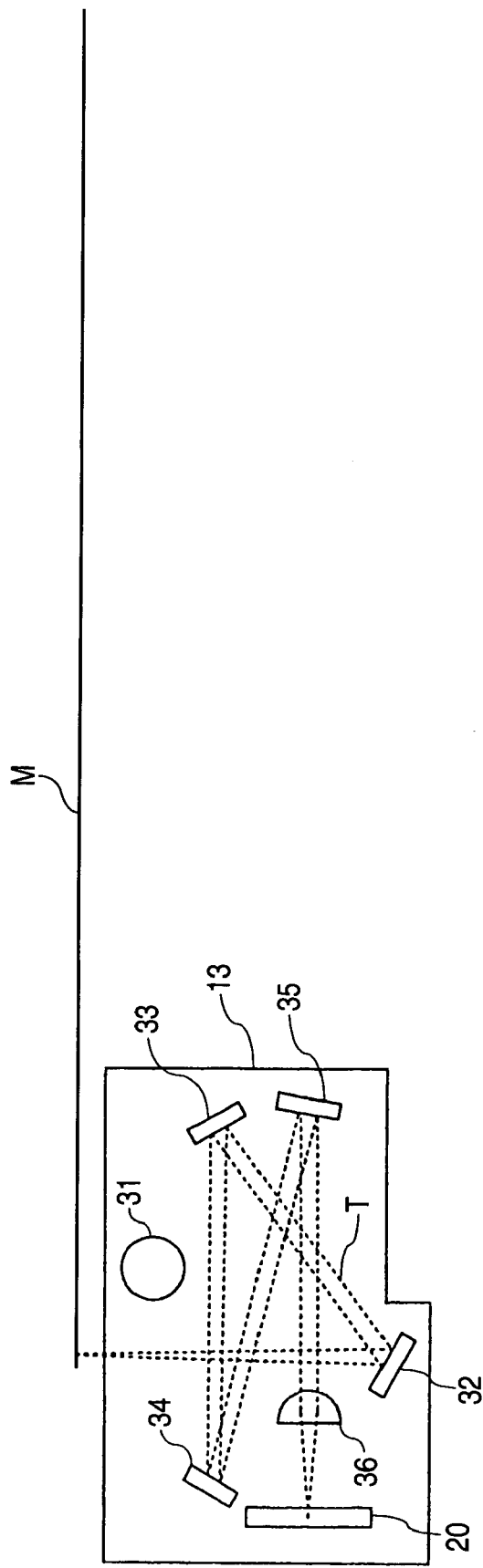
FIG. 2 is a schematic view showing optical paths that are formed by a first optical system in the image scanner according to the first embodiment of the present invention.

The first optical system 30 includes the light source 31, mirrors 32, 33, 34, 35, and a lens 36. The light source 31 is constituted by a tube illumination device such as a fluorescent tube lamp, or the like, and is installed into the carriage 13 in such a manner that a longitudinal axis of the light source 31 extends in parallel with a longitudinal axis of the linear image sensor 20. The mirrors 32, 33, 34, 35, and the lens 36 form an optical path T through which the optical image is input into the linear image sensor 20, as indicated by broken lines in FIG. 2.

The second optical system 40 includes mirrors 42, 43, 44 and an LED (Light Emitting Diode) 41 that is arranged directly under a length detecting position P as a detecting position set forth in claims to irradiate the length detecting position P. As indicated by broken lines in FIG. 1, the mirrors 42, 43, 44 form an optical path R through which light, which is emitted from the LED 41 when the original is present at the length detecting position P and then is reflected by the length detecting position P to input into the mirror 42, is guided to reach the linear image sensor 20 in the carriage 13 in its standby position via the mirror 35 and the lens 36 that are provided to the first optical system. In this case, the LED 41 and the mirror 42, 43 are arranged at the positions that do not, interfere the movement of the carriage.

Figure 3:
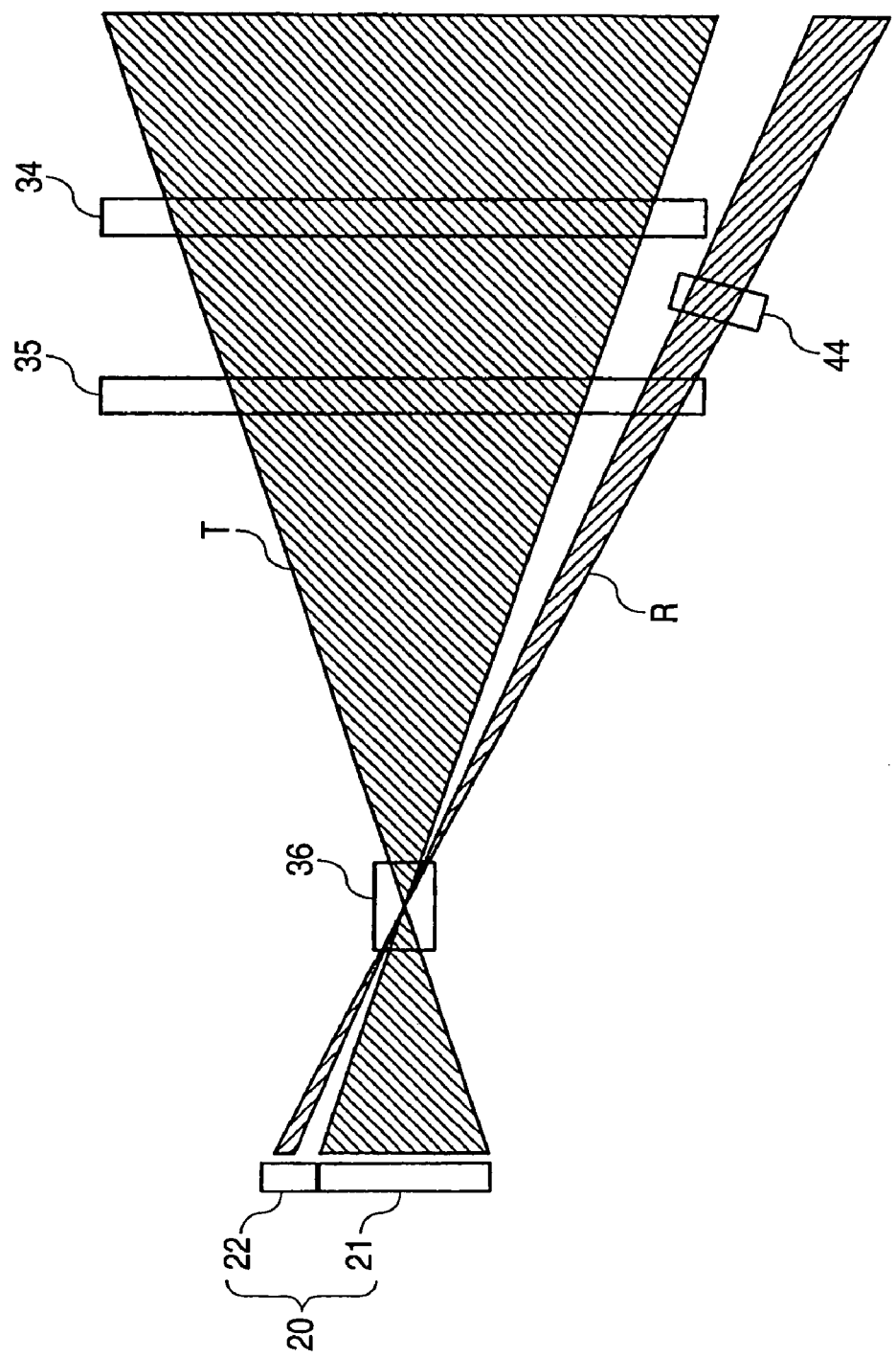
FIG. 3 is a view showing schematically the behavior that light reflected at a detecting position reaches a linear image sensor in the image scanner according to the first embodiment of the present invention.

FIG. 3 is a view showing schematic diagram that light, which is reflected by the mirror 44 in the second optical system 40, reaches the spare light receiving elements 22 in the linear image sensor 20. Reflected light at the length detecting position P is reflected by the mirror 44 in the second optical system 40 and then is input into the mirror 35 in the first optical system 30. The incident light is reflected by the mirror 35 and then comes up to the spare light receiving elements 22 in the linear image sensor 20 via the lens 36 in the first optical system 30, as shown in FIG. 3. In this case, the optical image on the main scanning line, which is input into the first optical system 30, is reflected by the mirror 34, then reflected by the mirror 35, and then is focused onto the light receiving elements 21 in the linear image sensor 20 via the lens 36.

As apparent from FIG. 3, the optical path R and the optical path T do not overlap with each other but intersect with each other on the optical axis of the lens 36. Therefore, main rays of the reflected light at the length detecting position P never coincide with main rays of the reflected light on the main scanning line. In other words is, a part of the first optical system via which the reflected light at the length detecting position P reaches the linear image sensor 20 are merely the mirror 35 and the lens 36, and thus the first optical system and the second optical system do not share the main rays.

In this case, explanation will be made in the following description under the assumption that the reflected light at the length detecting position P reaches the light receiving elements, which have the numbers 7495 to 7500, of the spare light receiving elements.

Figure 4:
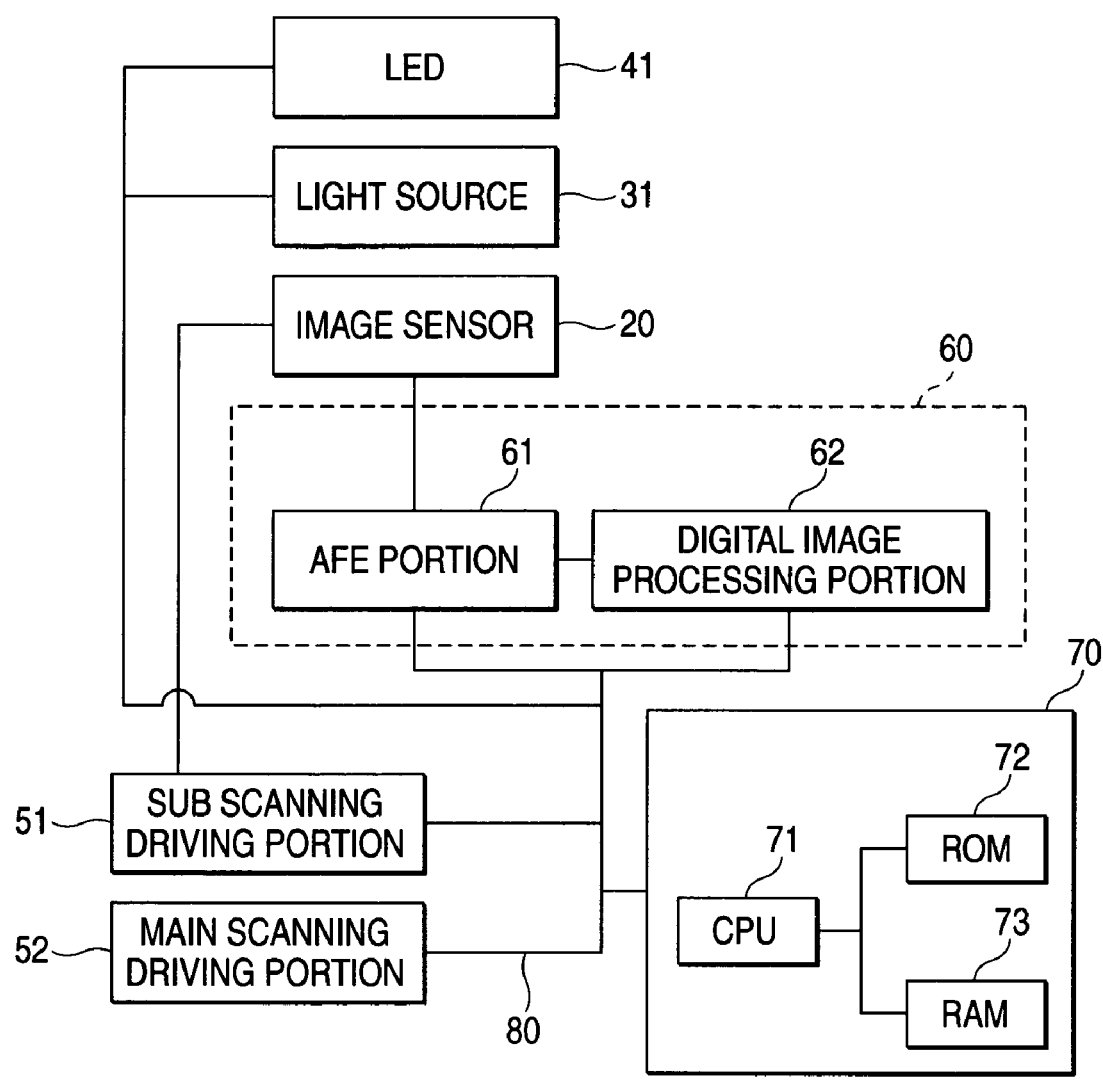
FIG. 4 is a block diagram showing an image scanner according to the first embodiment of the present invention.

FIG. 4 is a block diagram showing the image scanner 1.

A main scanning driving portion 51 is mounted onto a substrate that is fixed to the carriage 13. The main scanning driving portion 51 is a driving circuit that outputs a drive pulse, which is required to drive the linear image sensor 20, to the linear image sensor 20. The main scanning driving portion 51 is constructed by a synchronizing signal generator, a driving timing generator, etc., for example.

A sub scanning driving portion 52 is constructed by a belt retained by the carriage 13, a motor for rotating the belt and a gear train, a driving circuit, etc. and is installed in the main body. When the sub scanning driving portion 52 pulls the carriage 13 via the belt, the main scanning line that extends in the direction perpendicular to a sheet in FIG. 1 moves in the Z direction that is perpendicular to the above direction. Therefore, scanning of a two-dimensional image can be implemented.

A sub scanning unit set forth in the claim corresponds to the carriage 13 on which the linear image sensor 20 and the first optical system 30 are mounted, and the subs canning driving portion 52 that moves the carriage 13 in the Z direction.

A signal processing portion 60 includes an AFE portion 61 and a digital image processing portion 62.

The AFE portion 61 is constituted by an analog signal processing portion, an A/D converter, etc. The analog signal processing portion applies analog signal processes such as amplifying process, noise reducing process, etc. to an output signal, which is output from the linear image sensor 20 in an analog representation, to output the resultant signal. The A/D converter quantizes the analog output signal, which is output from the analog signal processing portion, into an output signal, which has a predetermined bit length in a digital representation, to output the resultant signal.

The digital image processing portion 62 applies the processes such as gamma correction, defective pixel interpolation executed by the pixel interpolation method, white balance correction, sharpening of the image signal, etc to an output signal that is output from the AFE portion 61 to form image data. In this case, various processes that are applied by the digital image processing portion 62 maybe replaced with the processes that are carried out in compliance with a computer program that is executed by a control portion 70.

The control portion 70 as a deciding unit in the claim includes a CPU 71, a ROM 72, and a RAM 73, and is connected to the main scanning driving portion 51, the signal processing portion 60, etc. via a bus 80. The CPU 71 executes the computer program stored in the ROM 72 to control respective portions of the image scanner 1. The CPU 71 decides the size and orientation of the original based on the electric signal, which is focused onto the linear image sensor 20 by tile first optical system 30 and is converted, and the electric signal being obtained by converting the light, which arrives at the linear image sensor 20, by virtue of the second optical system 40. The ROM 72 stores the computer program executed by the CPU 71, a decision table used to decide the size of the original, various data, etc. The RAM 73 stores temporarily the program and various data.

With the above, a configuration of the image scanner 1 is explained.

FIG. 5 is a table showing the size and orientation of the original that can be read by the image scanner 1.

Figure 6:
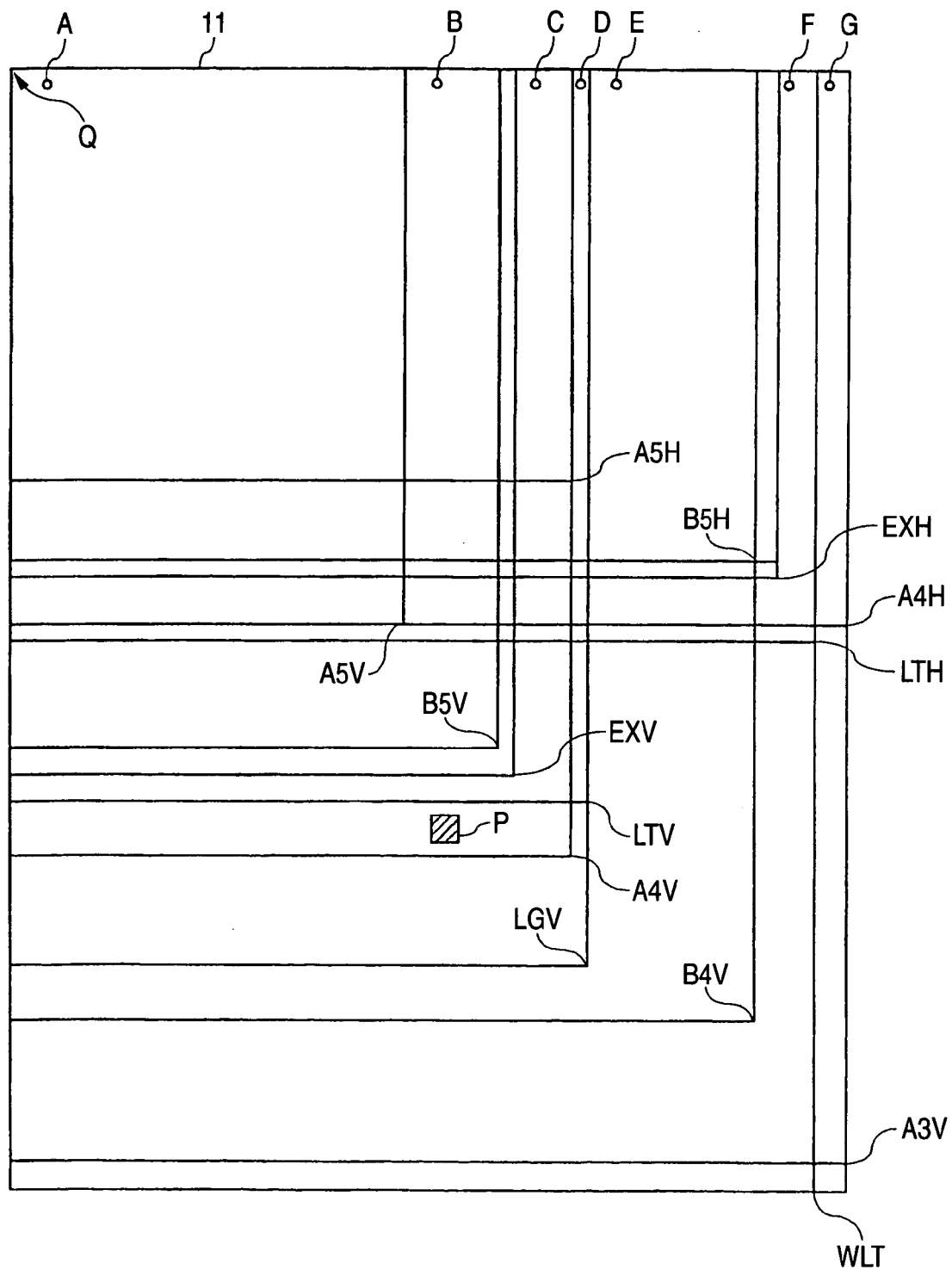
FIG. 6 is a plan view showing an original table provided to the image scanner according to the first embodiment of the present invention when viewed from the top.

FIG. 6 is a plan view showing the original table 11 when viewed from the top. In FIG. 6, frames A5H to WLT represent respective sizes of the original shown in FIG. 5. As shown in FIG. 6, the length detecting position P as the position at which the presence/absence of the original is detected is set to the position in the original having an A4 vertical size (A4V) that does not overlaps with the original having a letter vertical size (LTV), i.e., any position that is positioned in a range of 279.4 mm or more and 297 mm or less from the origin Q of the original table in the sub scanning direction and in a range of 0 mm or more and 210 mm or less from the origin Q in the main scanning direction. Width detecting positions A to G are the positions on the main scanning line, at which the length in the main scanning direction is detected when the carriage 13 is placed at the standby position. The width detecting positions A to G are set to any position that is away from the origin Q of the original table by 10 mm in the sub scanning direction and is positioned in any one of following ranges in the main scanning direction respectively.

0 mm<A<210 mm
148 mm<B<182 mm
184.2 mm<C<210 mm
210 mm<D<215.9 mm
215.9 mm<E<257 mm
266.7 mm<F<279.4 mm
279.4 mm<G<297 mm

In this case, a B5 vertical size (B5V) and an executive vertical size (EXV), and a B5 horizontal size (B5H) and an executive horizontal size (EXH) are set respectively such that only any one of them can be read according to the setting.

FIG. 7A is a table showing the numbers of the light receiving element into which the optical images at the width detecting positions A to G shown in FIG. 6 are input. The optical images at the width detecting positions A to G are focused onto five corresponding light receiving elements by the first optical system respectively. Then, the length of the original in the main scanning direction is decided by deciding the presence/absence of the signals of respective light receiving elements.

FIG. 7B is a decision table used to decide the size and orientation of the orientation. For example, if the original having an A4 vertical size is put on, the light receiving elements corresponding to the width detecting positions A to C become "signal present". Therefore, it is identified based on the decision table that the size or the original corresponds to either an A5 horizontal size or an A4 vertical size. In contrast, it is decided at the length detecting position P that the light receiving elements of the numbers 7495 to 7500, into which the light at the length detecting position P is input, of the spare light receiving elements 22 become "signal present". Therefore, it is identified that the size of the original is more than an A4 vertical size. As a result, only the A4 vertical size can be identified as the size that can satisfy both conditions simultaneously. Similarly, all sizes of other originals can be identified uniquely.

FIG. 8 is a flowchart showing a flow of processes by which the image scanner 1 detects the size and orientation of the original. These processes are started when the user closes the original cover 14 in the state that the carriage 13 is in the standby position. In this case, the process of detecting the size and orientation of the original is also started when the user pushes down an automatic reading start button (not shown) to indicate a start of the reading in the state that the original cover is opened or when a start of the reading is indicated by the control device such as the personal computer, or the like connected to the image scanner in the state that the original cover is opened.

If the control portion 70 detects that an operation of closing the original cover 14 is started by an open/close sensor, it turns the light source 31 of the first optical system 30 and the LED 41 of the second optical system 40 ON (S110). After a predetermined time has lapsed, the linear image sensor 20 outputs the electric signals, which respond to the charges stored in respective light receiving elements, to the signal processing portion 60. That is, the electric signals generated by converting the optical image on the main scanning line and the light being reflected at the length detecting position P, which are obtained immediately when the original cover 14 is closed, are output. The signal processing portion 60 applies a predetermined process to the output electric signals to convert such output electric signals into digital output signals and then outputs such signals to the control portion 70 (S115). The control portion 70 checks the output signals, which are converted from the electric signals being output from the light receiving elements corresponding to the width detecting positions A to G, out of the output signals that are output from the signal processing portion 60, and decides the presence/absence of the signals at the width detecting positions A to G respectively. More particularly, under the assumption that the output signal is represented by 1 byte, if values of three output signals out of five output signals which are converted from the electric signals being output from five light receiving elements corresponding to the width detecting positions A to G respectively, are in a range of 32 or more and 255 or less successively, the signals at the concerned width detecting positions are decided as "signal present" (S120). Then, similarly it is decided whether or not three values of the output signals obtained by converting the reflected lights, which come from the second optical system 40, into the electric signals by five light receiving elements of the numbers 7495 to 7500 are in the range of 32 or more and 255 or less successively. For example, assume that the size of the loaded original is the A4 horizontal size. In this case, since no original is present at the length detecting position P, the light emitted from the LED 41 is not reflected immediately before the original cover 14 is closed. Hence, the light that reaches the spare light receiving elements 22 becomes the weak and dark light, and thus the value obtained when the light is converted into the digital output signal is below 32. Therefore, the length detecting position P is decided as "signal absence" (S125). The control portion 70 decides the size and orientation of the original in accordance with the decision table in FIG. 7(b) based on the presence/absence of the signals at the width detecting positions A to G and the presence/absence of the signal at the length-detecting position P (S130). The size and orientation of the original are decided according to the above processes.

For example, if the image scanner 1 and the printer are connected to the control system such as the personal computer, or the like, such image scanner 1 reads the original based on the decided size and orientation of the original, and the digital image processing portion 62 forms the image data to output such data to the control system. The control system forms print data by applying the processes such as binarization, etc. to the image data to output to the printer, and also issues the instruction to print the print data on a paper whose size and orientation are decided by the image scanner 1.

Next, advantages of the first embodiment will be explained hereunder.

The image scanner 1 in the first embodiment causes the second optical system 40 to transmit the light, which is reflected at the length detecting position P, to the linear image sensor 20. That is, the light reflected at the length detecting position P goes to the linear image sensor 20 as the image sensor that is used to read the original. Therefore, a time required to move the carriage 13 in the sub scanning direction so as to receive the light, which is reflected at the length detecting position P, can be omitted, and also the provision of the dedicated sensor used to detect the presence/absence of the original at the length detecting position P can be omitted. As a result, the size and orientation of the original can be decided in a short time without provision of the dedicated sensor. Also, since the dedicated sensor is not provided, a production cost of the image scanner 1 can be reduced while deciding the size and orientation of the original in a shore time.

When the image scanner 1 in the first embodiment detects the presence/absence of the signals on the main scanning line at the width detecting positions A to G and the length detecting position P in the standby position, such scanner causes the optical image on the main scanning line to input into the light receiving elements 21, which read the original, in the linear image sensor 20 and also causes the light, which is reflected at the length detecting position P, to input into the spare light receiving elements 22. Accordingly, conversion of the optical image on the main scanning line and conversion of the light reflected at the length detecting position P can be executed at the same time, and thus detecting of the size of the original can be executed in a shorter time. In addition, since normally the spare light receiving elements 22 are provided to the linear image sensor, the image scanner 1 in the first embodiment causes such spare light receiving elements 22 to convert the light reflected at the length detecting position P into the electric signals. As a result, the cost increase caused when the conversion of the light reflected at the length detecting position P into the electric signal is executed simultaneously by transmitting such light to the light receiving elements, which are different from the light receiving elements to which the optical image on the main scanning line is input, can be suppressed. Thus, a detecting time of the size and orientation of the original can be reduced much more without increase of the cost.

In this case, in the first embodiment, the LED 41 is provided to the second optical system to irradiate the length detecting position P. However, the light of the light source 31 may be irradiated by providing an optical path that guides the light of the light source 31, which is provided to the first optical system 30, onto the length detecting position P.

Further, in the first embodiment, the open/close sensor for detecting the open/close of the original cover 14 is provided, and then the process of detecting the size and orientation of the original is started when the close of the original cover 14 is detected. In this case, if the original mat 15 is colored in any color except a white color, such process may be started, for example, when the start but ton used to start the image reading is pushed after the original cover 14 is closed completely.

Second Embodiment

A configuration of an image scanner 2 as a second embodiment of an image reading system according to the present invention will be explained hereinafter. The image scanner 2 is the so-called moving mirror type image reading system in which only the optical system is installed into the carriage. In this case, explanation of the substantially same portions as those in the first embodiment will be omitted from the following description.

Figure 9A:
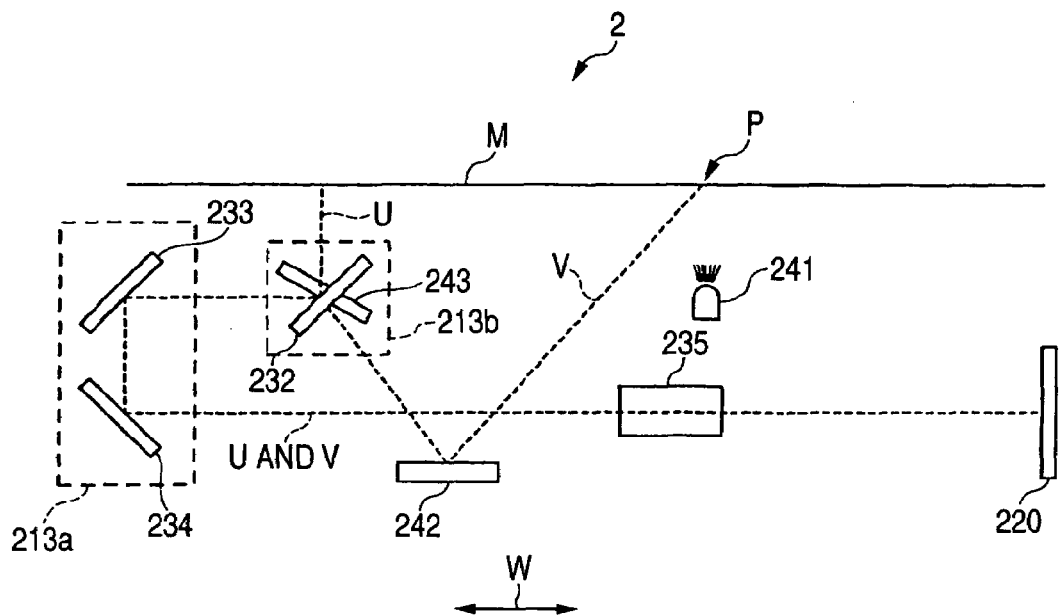
FIG. 9A is a schematic view showing an image scanner according to a second embodiment of the present invention.

FIG. 9A is a schematic view showing the image scanner 2. The image scanner 2 is the so-called flat bed type in which the original table is provided to an upper surface of the cuboid main body. In this case, M in FIG. 9A denotes the original that is loaded on the original table.

A carriage 213a and a carriage 213b are installed into the main body so as to allow the reciprocating motion in parallel with the plate surface of the original table. The carriage 213a includes a mirror 233 and a mirror 234 in the first optical system, and the carriage 213b includes a mirror 232 in the first optical system. The carriage 213a and the carriage 213b are fitted slidably to a guiding shaft, or the like, which is provided in parallel with the plate surface of the original table. A longitudinal axis of the guiding shaft extends in the W direction in FIG. 9A. The carriage 213a and the carriage 213b are pulled by the belt, for example, to carry the first optical system except a lens 235 in the W direction in FIG. 9A. At this time, the carriage 213a is carried in the W direction at a half speed of the carriage 213b such that an optical length of an optical path U, which is formed by the first optical system, can be kept constant. For example, if the carriage 213b is carried by a distance L, an optical length can be kept constant by setting a traveling distance of the carriage 213a to L/2 because the optical path U returns back at the mirror 233 and the mirror 234. A standby position of the carriage 213b may be set to any position that is remote from the origin being set on the original table by any distance if the carriage 213b can input the optical image of the minimum size original, which is put on the predetermined position on the original table, on the main scanning line into a linear image sensor 220. A standby position of the carriage 213a is set to a position that is remote from the standby position of the carriage 213b by a predetermined distance such that an optical length of the optical path U, which is formed by the first optical system, becomes a predetermined length.

The first optical system comprises a light source (not shown), the mirrors 232, 233, 234, and the lens 235. As indicated by broken lines in FIG. 9A, the mirrors 232, 233, 234, and the lens 235 constitute the optical path U that focuses the optical image on the main scanning line onto the linear image sensor 220.

The second optical system comprises an LED (Light Emitting Diode) 241, a mirror 242, and a mirror 243. The LED 241 and the mirrors 242, 243 are fixed in the main body not to interfere with the movement of the carriage 213a and the carriage 213b. When the carriage 213a and the carriage 213b are placed at their standby positions, as indicated by broken lines in FIG. 9A, the second optical system forms an optical path V that inputs the light, which is emitted from the LED 241, then reflected at the length detecting position P, and then input into the mirror 242, into the linear image sensor 220 via the mirror 233, the mirror 234, and the lens 235 which are provided to the first optical system. In this case, the optical path V is formed only when the carriage 213a and the carriage 213b are placed at their standby positions. Therefore, the mirror 243 may be placed at any position unless the carriage 213b is placed at its standby position. For example, the mirror 243 may be mounted onto the carriage 213b.

Figure 9B:
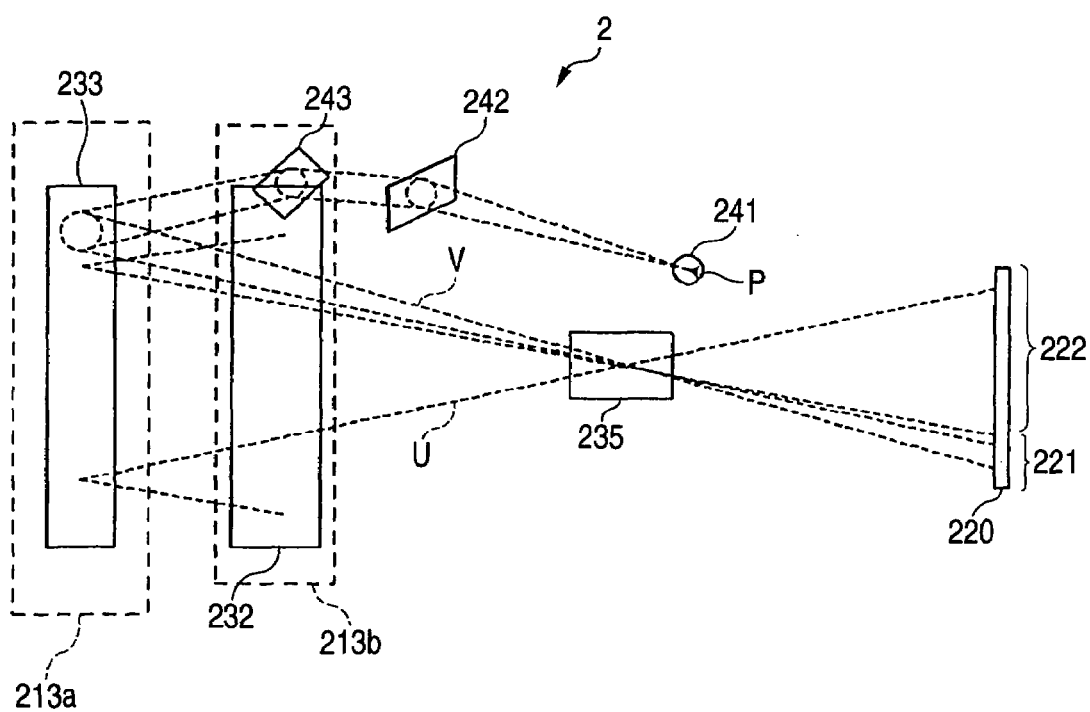
FIG.9B is a view showing schematically a behavior that light reflected at a detecting position reaches the linear image sensor in the image scanner according to the second embodiment of the present invention.

FIG. 9B is a view showing a schematically diagram that the light reflected by the mirror 243 in the second optical system reaches the spare light receiving elements 221 in the linear image sensor 220. When the carriage 213a and the carriage 213b are placed at their standby positions, the light that is reflected at the length detecting position P is reflected by the mirrors 242 and 243 in the second optical system, and then input into the mirror 233 in the first optical system. The incident light is reflected by the mirror 233 and mirror 234 not shown in FIG. 9B, and then reaches the spare light receiving elements 221 in the linear image sensor 220 via the lens 235 in the first optical system. In this case, the optical image on the main scanning line, which is input into the first optical system, is reflected by the mirror 232, then reflected by the mirror 233 and mirror 234 not shown in FIG. 9B, and then input into light receiving elements 222 in the linear image sensor 220 via the lens 235.

As described above, the present invention can also be applied to the moving mirror type image reading system.

What is claimed is:

1. An image reading system comprising:
   an original table on which an original is to be put;
   a linear image sensor for converting light into an electric signal;
   a first optical system for forming a first optical path that reaches the linear image sensor from a main scanning line on a plate surface of the original table to input an optical image on the main scanning line to the linear image sensor, the first optical system disposed below the original table;
   a second optical system for forming a second optical path that reaches the linear image sensor from a detecting position on the plate surface of the original table, the detecting position being remote from the main scanning line in a sub scanning direction perpendicular to the main scanning line, the second optical system disposed below the original table;
   a subscanning unit for moving the main scanning line in parallel with the sub scanning direction along the plate surface of the original table, the sub scanning unit including a carriage on which the linear image sensor, the first optical system and a part of the second optical system are mounted and a controller for reciprocating the carriage in the sub scanning direction; and
   a deciding unit for deciding a size and an orientation of an original based on an electric signal, which is converted from light that reaches the linear image sensor from the main scanning line via the first optical path, and an electric signal, which is converted from light that reaches the linear image sensor from the detecting position via the second optical path when the carriage is placed at a predetermined position in which both the first optical path and the second optical path are formed.

2. The image reading system according to claim 1, wherein
the linear image sensor includes a first light receiving element into which an optical image on the main scanning line is input and a second light receiving element different from the first light receiving element, and
the second optical system forms an optical path that reaches the second light receiving element from the detecting position.

3. The image reading system according to claim 1, wherein the second optical system includes a light source for irradiating the detecting position, and mirrors for reflecting light input from the detecting position to a direction that reaches the linear image sensor via at least a part of the first optical system.

* * * * *